May 25, 1943.　　　　H. M. BOLSTON　　　　2,319,915
CLAMPING DEVICE FOR TEMPLATE AND STOCK USED IN SHAPING CUTTING DIES
Filed June 3, 1940　　　　2 Sheets-Sheet 1
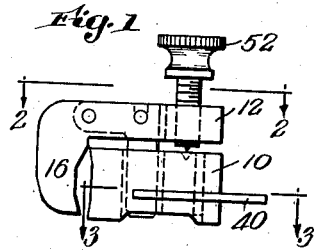
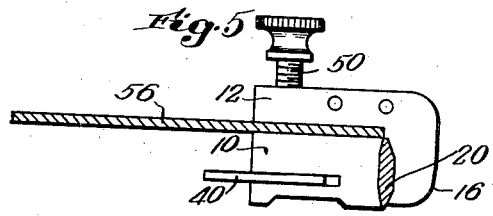
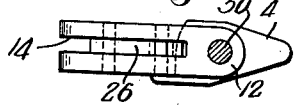
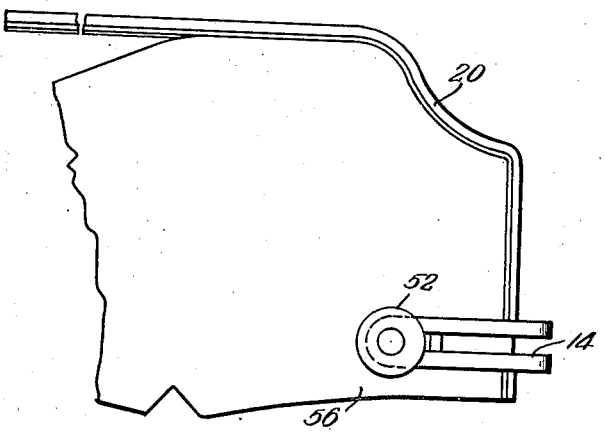
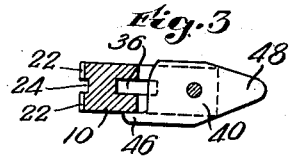
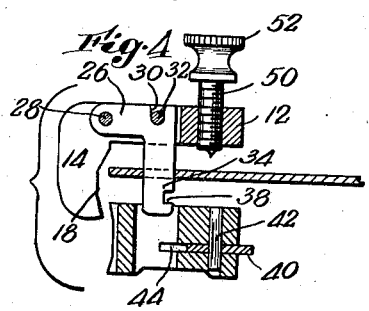
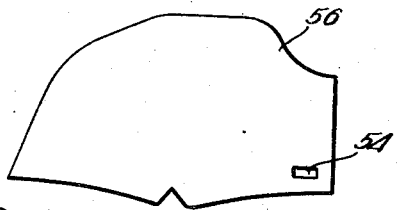
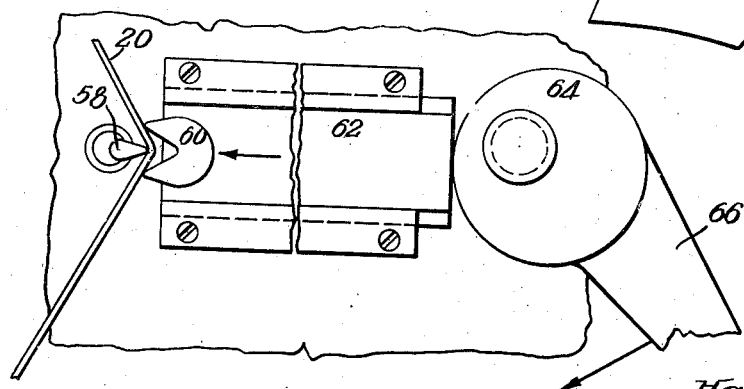
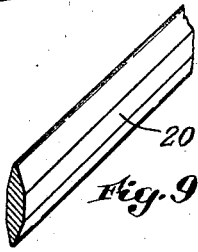
Inventor
Harry M. Bolston
by Thomson & Thomson
his Attys.

May 25, 1943.  H. M. BOLSTON  2,319,915
CLAMPING DEVICE FOR TEMPLATE AND STOCK USED IN SHAPING CUTTING DIES
Filed June 3, 1940   2 Sheets-Sheet 2
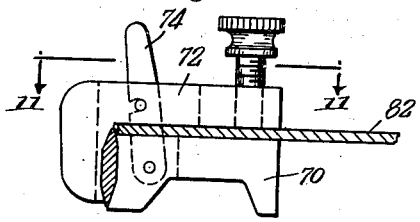
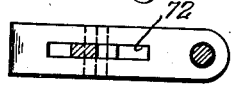
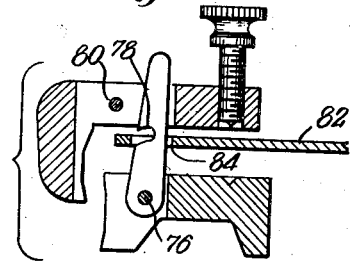

Patented May 25, 1943

2,319,915

UNITED STATES PATENT OFFICE 2,319,915

CLAMPING DEVICE FOR TEMPLATE AND STOCK USED IN SHAPING CUTTING DIES

Harry M. Bolston, Revere, Mass.

Application June 3, 1940, Serial No. 338,539

6 Claims. (Cl. 153—48)

The present invention relates to improvements in a clamping device for the template and die stock used in shaping cutting dies particularly of the type known as clicker dies principally used in the shoe trade for stamping out the parts of shoes.

In the shoe industry, in view of the many sizes and shapes of shoes it is necessary to have a large number of dies, commonly known as clicker dies, each of which has been formed to exact shape to cut out a shoe part of the exact contour. The dies are commonly made from straight pieces of die stock having either a single or double cutting edge. A template is formed to the shape of the part which must be cut by the die. The die stock is bent or shaped with the help of mechanical bending means and it is necessary for the operator to carefully check the bends against the template. After the ends of the die stock are brought together they are welded to close and complete the die.

It is an object of the present invention to provide a clamping device which will hold the die stock in proper relationship to the template while the die stock is being bent to shape.

It is a further object of my invention to provide a clamping device for the template and die stock in which the template is positioned with respect to the die stock by the provision of an opening or slot spaced from the edge of the template.

It is a still further object of my invention to provide a clamping device which is made in two parts to permit convenient assembly of the template and die stock with respect thereto and the provision of a single clamping screw which is operative to simultaneously clamp the template and the die stock so that both are securely held. Further objects and advantages of my invention will be more readily apparent from the following description of the preferred embodiments thereof as disclosed on the attached drawings in which:

Fig. 1 is a side elevation of the preferred form of my clamping device;

Fig. 2 is a plan view partially in section on the plane indicated 2—2 in Fig. 1;

Fig. 3 is a detail sectional view on the plane indicated 3—3 in Fig. 1;

Fig. 4 is a vertical section showing the parts in position for assembly;

Fig. 5 is a side elevation looking from the opposite side to that shown in Fig. 1 in which the template and die stock are assembled with respect to the clamping device and shown in section;

Fig. 6 is a plan view of the clamping device, template and die stock showing the manner of shaping the clicker die;

Fig. 7 is a plan view of a template with a positioning slot spaced from the marginal edge thereof;

Fig. 8 is a diagrammatic plan view of the forming tool which is used in shaping the die stock;

Fig. 9 is a perspective view of a portion of the straight die stock;

Fig. 10 is a side elevation partially in section showing a modified form of the clamping device;

Fig. 11 is a sectional view taken on the plane indicated 11—11 in Fig. 10;

Fig. 12 is a vertical section showing the parts in position for assembly;

The clamping device disclosed in Figs. 1 to 6 inclusive comprises a base block 10 to which is attached a generally L-shaped clamping head 12. The head is bifurcated with a slot 14 forming spaced depending fingers 16, the inner faces or jaws 18 of which are shaped to clamp the die stock 20 against the clamping faces or jaws 22 of the base block 10. The jaws 22 are separated by a groove 24. An L-shaped lever 26 is pivotally attached by pin 28 to the clamping head. The lever 26 has a notch 30 adapted to engage a pin 32 which serves as a stop to limit the upward movement of the lever. The depending arm 34 of lever 26 is adapted to be received in a vertical slotted opening 36 formed in the base block. The arm 34 is formed with a notch 38 adapted to be engaged by a pivoted locking finger 40 which is secured by the pivot pin 42 and received in a horizontal slot 44 cut in the base block. The locking finger 40 is provided with a lip 46, serving as a stop, and a protruding portion 48 which may be readily engaged manually to move the locking finger when it is desired to connect or disconnect the parts of the clamp. At one end of the head spaced from the pivot pin 28 a clamping screw 50 provided with a knurled head 52 is threaded through the head.

The clamping parts are assembled as shown in Fig. 4, the depending arm 34 of lever 26 being received in a slotted opening 54 formed in the template 56. The opening 54 serves to position the template with its marginal edge closely adjacent the upper edge of the die stock which is to be bent to the shape of the template. Turning of the clamping screw will serve securely to hold the template in position and simultaneously cause the die stock to be securely gripped between the opposed clamping faces. The die stock is then bent around the template as illustrated in Fig. 6 and by the apparatus shown in Fig. 8. The die stock is engaged between a fixed die member 58 and a movable die head 60 on a slide 62 which is operated by an eccentric 64 controlled by a manually operable lever arm 66.

A modified construction is illustrated in Figs. 10–12 inclusive in which the base block 70 and clamping head 72 are connected by a lever 74 mounted in the base block by a pivot pin 76. The lever 74 is provided with a notch 78 to engage a pin 80 mounted in the clamping head. The template 82 is formed with a slot 84 adapted to engage the lever 74 to position the template as previously described.

In both forms thus far described the parts of the clamp are separable to permit assembly with a template having a positioning opening spaced from the edge thereof and by a relatively slight movement of the positioning lever the template may be adjusted laterally with respect to the die stock before the clamp is tightened. Furthermore, such clamp may be used with relatively thick template stock.

In both forms of the invention the opposed clamping faces for the die stock 20 are located at the forward end of the clamp and the lever which connects the two parts of the device is pivotally attached to one part and extends toward and cooperates with the other part rearwardly of the clamping faces. The template is placed between the said two parts and the projecting of the lever through the opening 54 locates the template accurately both forwardly and rearwardly relative to the die stock 20 gripped by the clamping faces.

I claim:

1. In the manufacture of shoe cutting dies, a clamp for holding a template in association with the die stock during bending comprising a base block, an L-shaped head member and an L-shaped connecting lever, the two arms of the L-shaped head member being arranged to extend along two sides of the base block, said L-shaped lever being pivotally connected to said head member and having a depending arm adapted to be received in an opening formed in the base block, a movable locking finger carried by said base block adapted to engage the depending arm of said lever to removably connect the parts, and a clamping screw threaded into the head member adapted to grip the template and the die stock between opposed faces of said clamp.

2. A clamp for holding die stock in association with a template during bending of the die stock in the manufacture of clicker dies comprising a bifurcated L-shaped head member and a base block having opposed clamping faces adapted to engage the die stock and the template, the two arms of the L-shaped head member being arranged to extend along two sides of the base block, an L-shaped lever pivotally mounted in the bifurcated head having a depending arm adapted to be received in an opening spaced inwardly from the edge of the template to position the template with respect to an edge of the die stock, a pivotally mounted locking finger carried by said base block and adapted to engage said depending arm, and a clamping screw carried by said head operated to cause simultaneous gripping of the template and die stock.

3. A clamp for holding die stock in association with a template during bending of the die stock in the manufacture of clicker dies comprising a base block having spaced clamping jaws at one end, said block having a vertically disposed slotted opening and an intersecting horizontally disposed slotted opening, a locking finger received in the horizontal slot, a vertical pin pivotally holding said finger in place, said block having a top face on which the template may seat, an L-shaped clamping head having spaced clamping jaws adapted to co-operate with the jaws of said block to hold the die stock, the two arms of the L-shaped head member being arranged to extend along two sides of the base block, an L-shaped lever pivotally mounted in said head member having a depending arm adapted to loosely fit into the vertical slot of said block, said arm having a notch adapted to be engaged by said locking finger, a stop pin in said head limiting upward movement of said lever, said lever serving to position the template with respect to the die stock, and a clamping screw at one end of said head effective to tighten the clamp on the template and die stock.

4. A clamp for holding die stock in association with a template during bending of the die stock in the manufacture of clicker dies comprising a base block and an L-shaped head member having opposed clamping faces to engage the die stock and template, said block and head having vertically disposed slotted openings, a pair of pin members transversely disposed in said block and head extending across said slotted opening, a lever arm pivotally carried by one of said pins and having a notch to engage the other pin to lock said block and head together, said lever being received in an opening spaced from the edge of the template to position the template with respect to an edge of the die stock, and a clamping screw extending through said head effective to tighten the clamp on the template and die stock.

5. A clamping device for holding a template in association with die stock during bending of the latter to form a shoe cutting die, comprising two parts embodying a base block and a cooperating L-shaped head, the block and head having a pair of opposed clamping faces adapted to grip the die stock and the head having a surface substantially right angular to said clamping faces for supporting the template in cooperating relation with an edge of the die stock, the template having a slotted opening therethrough spaced from but adjacent to an edge thereof, an element connected to one of said parts and having an arm extending toward and cooperating with the other part rearwardly of said opposed clamping faces, the template being adapted to rest on said surface with the arm extending through its said opening, releasable means for connecting the arm with said other part, and means for clamping the template onto said surface and simultaneously tightening said clamping faces on the die stock.

6. A clamping device for holding a template in association with die stock during bending of the latter to form a shoe cutting die, comprising two parts embodying a base block and a cooperating L-shaped head, the block and head having a pair of opposed clamping faces adapted to grip the die stock and the head having a surface substantially right angular to said clamping faces for supporting the template in cooperating relation with an edge of the die stock, the template having a slotted opening therethrough spaced from but adjacent to an edge thereof, a lever attached to one of said parts and extending toward and cooperating with the other part wholly rearwardly of said opposed clamping faces, the template being adapted to rest on said surface with the lever extending through its said opening and thereby locating the template in predetermined position relative to said clamping faces, releasable means for connecting the lever with said other part on the side of the template opposite to its said pivotal attachment, and means for clamping the template onto said surface and simultaneously tightening said clamping faces on the die stock.

HARRY M. BOLSTON.